(12) United States Patent
Singala et al.

(10) Patent No.: US 9,040,444 B2
(45) Date of Patent: May 26, 2015

(54) SEMI CONTINUOUS PROCESS FOR THE SYNTHESIS OF A CATALYST FOR USE IN THE MANUFACTURE OF POLYOLEFINS

(75) Inventors: Kamlesh Singala, Maharashtra (IN); Saurabh Singh, Maharashtra (IN); Virendrakumar Gupta, Maharashtra (IN)

(73) Assignee: Reliance Industries Limited, Navi Mumbai (IN)

( * ) Notice: Subject to any disclaimer, the term of this patent is extended or adjusted under 35 U.S.C. 154(b) by 398 days.

(21) Appl. No.: 13/514,726

(22) PCT Filed: Dec. 14, 2010

(86) PCT No.: PCT/IN2010/000809
§ 371 (c)(1),
(2), (4) Date: Nov. 6, 2012

(87) PCT Pub. No.: WO2011/077447
PCT Pub. Date: Jun. 30, 2011

(65) Prior Publication Data
US 2013/0053521 A1    Feb. 28, 2013

(30) Foreign Application Priority Data

Dec. 22, 2009 (IN) .................. 1691/MUM/2009

(51) Int. Cl.
| C08F 4/642 | (2006.01) |
| C08F 4/649 | (2006.01) |
| C01G 23/047 | (2006.01) |
| C01G 23/053 | (2006.01) |
| C08F 2/02 | (2006.01) |
| C08F 10/06 | (2006.01) |
| C08F 110/06 | (2006.01) |

(52) U.S. Cl.
CPC ............ *C08F 10/06* (2013.01); *C01G 23/0536* (2013.01); *C01P 2004/51* (2013.01); *C08F 110/06* (2013.01); *Y10S 526/908* (2013.01)

(58) Field of Classification Search
USPC .......... 526/142, 908; 422/610, 187; 502/104, 502/107; 423/612
See application file for complete search history.

(56) References Cited

U.S. PATENT DOCUMENTS 7,417,161 B2 *    8/2008 Woo et al. ................ 558/270

FOREIGN PATENT DOCUMENTS

| WO | 2002/096558 A1 | 5/2002 |
| WO | 2005/035597 A1 | 4/2005 |
| WO | 2009/116057 A2 | 9/2009 |
| WO | WO 2009/130707 A2 * | 10/2009 |

* cited by examiner

*Primary Examiner* — Fred M Teskin
(74) *Attorney, Agent, or Firm* — Ladas & Parry LLP

(57) ABSTRACT

A semi-continuous process and system thereof, for the synthesis of a narrow particle size distribution Zeigler Natta procatalyst for use in the manufacture of polyolefins. The process comprises: (a) mixing a reaction mixture containing a titanium compound; (b) charging a first reactor with said reaction mixture; (c) removing excess reactants from said first reactor as a filtrate; (d) feeding said filtrate to at least one further reactor; and continuously removing excess reactants from said at least further reactor.

27 Claims, 6 Drawing Sheets

SEMI CONTINUOUS PROCESS FOR THE SYNTHESIS OF A CATALYST FOR USE IN THE MANUFACTURE OF POLYOLEFINS

RELATED APPLICATION INFORMATION

This application is a 371 of International Application PCT/IN2010/000809 filed 14 Dec. 2010 entitled "A Semi Continuous Process For The Synthesis Of A Catalyst For Use In The Manufacture Of Polyolefins", which was published in the English language on 30 Jun. 2011, with International Publication Number WO 2011/077447 A2, and which claims priority from Indian Patent Application 1691/MUM/2009, filed 22 Dec. 2009, the content of which is incorporated herein by reference.

FIELD OF INVENTION

The present invention relates to a semi-continuous process for the synthesis of a catalyst for use in the manufacture of polyolefins. More particularly, the present invention relates to a semi-continuous and highly energy efficient process for the synthesis of a catalyst with an option of in-situ catalyst segregation with respect to particle size and control of fines. In particular, the present invention relates to semi-continuous process for the synthesis of a Zeigler Natta catalyst having extremely narrow particle size distribution by employing magnesium alkoxide as precursor with spherical morphology and the catalyst obtained from it for use in olefin polymerization. The present invention also relates to a process for the preparation of polyolefins having low fine content using the novel catalyst with in situ controlled particle size of the present invention. The present invention also provides a system for manufacture of polyolefins using the novel catalyst of the invention.

BACKGROUND OF INVENTION

Solid supported heterogeneous Ziegler Natta catalyst is obtained by contacting a solid support consisting of magnesium halide or a compound which on reaction gives magnesium halide with titanium compound having at least one titanium halogen bond, in presence/absence of electron donating compound.

U.S. Pat. No. 6,841,633 describes the use of less expensive starting material, hydrated magnesium chloride with in-situ generated internal donor. The use of ester is avoided to minimize the generation of byproducts making the catalyst very efficient. U.S. Pat. No. 7,265,074 of the present applicants, teaches a single step process for olefin catalyst synthesis through microwave technique.

Morphology retention is an important criterion for olefin polymerization catalyst in terms of polymerization plant operability and throughput. PCT/IN2008/000555 describes a novel magnesium alkoxide precursor with improved mechanical strength. The claimed precursor retains its shape and size throughout the catalyst and polymerization processes.

The above-mentioned prior art processes suffer from several drawbacks. In all these processes, the process of catalyst synthesis goes through a series of reaction/washing stages. As the number of stages increases, the tendency of particle breakage due to mechanical attrition increases. U.S. Pat. No. 6,770,718 B2 describes a single step reaction process in which solvent is taken in the reactor and cooled: Solid support is charged at lower temperature and donor at 40° C. Pure $TiCl_4$ addition is started during the heating or on reaching the reaction temperature. Simultaneously, liquid is taken out by filtration so as to keep the total volume in the reactor constant. After certain period, the composition of the incoming stream is also changed from pure $TiCl_4$ to 1:1 ratio of $TiCl_4$ and toluene or $TiCl_4$ and ethylbenzene. At the end of the reaction, slurry in the reactor is allowed to settle and supernatant liquid is siphoned off. The resultant solid is subjected to six batch washings. The overall process is batch type and is therefore not commercially advantageous, particularly since the volume of the reactor and total time cycle of batch is not reduced.

US Patent 2008/0194781 A1 describes a process where the catalyst is prepared in three stages. In the first stage, $MgCl_2.EtOH$ adduct is treated with triethyl aluminium (TEAL) at lower temperature (0° C.) in continuous manner, where liquid is continuously charged from top and withdrawn from the bottom through a filter while maintaining constant slurry concentration in the reactor. The second stage is treatment of solids with $TiCl_4$, and finally the catalyst is washed in a continuous manner as stated above. In this patent, an additional step of treatment with TEAL at 0° C. is required, making the process very expensive and hazardous. The process also does not specify any method of control over catalyst particle size distribution and fines content. Precursors of different particle size are required to produce catalysts of different particle size.

OBJECTS OF THE INVENTION

It is therefore, an important object of the present invention to provide a novel process that is semi-continuous in nature for the synthesis of a catalyst having reduced batch time and reaction volume.

It is another object of the present invention to provide a Ziegler Natta (Z-N) catalyst having reduced batch time and reaction volume.

It is another object of the invention to provide a process for the synthesis of a catalyst for use in polyolefin manufacture, in which it is possible to segregate in-situ catalyst particles of different PSD for various applications during the reaction.

It is another object of the present invention to provide a process for the synthesis of a catalyst for use in polyolefin manufacture in which it is possible to in situ separate the fine particles, thus achieving better control over catalyst particle size.

It is yet another object of the present invention to provide a process for the synthesis of a catalyst for use in polyolefin manufacture with minimal attrition and in which morphology of the catalyst is retained throughout the process.

It is another object of the invention to provide a process for the synthesis of a catalyst resulting in narrow particle size distribution and low fine content.

It is yet another object of the present invention to provide a process for the synthesis of a catalyst which is applicable to all the generations of Z-N catalyst having different internal donors.

It is yet another object of the present invention to provide a process for the synthesis of a catalyst which is highly energy efficient over the conventional olefin polymerization catalyst preparation processes.

It is yet another object of the present invention to provide a process for the synthesis of a catalyst which saves 20% to 70% time over the conventional batch processes and which can be operated at any temperature.

It is yet another object of the present invention to provide a process for the synthesis of a catalyst in which any type of precursor can be used with any type of particle size distribution.

It is yet another object of the present invention to provide a process for the synthesis of a high activity catalyst in which there is no requirement of additional treatment with TEAL during catalyst synthesis.

SUMMARY OF THE INVENTION

The above and other objects of the present invention are achieved by a process which broadly comprises charging a first reactor with a reaction mixture consisting of a titanium compound having at least one titanium halogen bond and a chloro-solvent, removing excess reactants from said first reactor as a filtrate and feeding said filtrate to at least one further reactor connected to said first reactor in series or in parallel to collect the particles carried over from the first reactor. The filtrate from the further reactor can be subjected to distillation to remove impurities while continuously charging the distillate from the distillation vessel to the first reactor, optionally treating the residue from distillation with an alkali to obtain titanium hydroxide calcining said titanium hydroxide to obtain titanium oxide as a byproduct.

In a preferred embodiment, the present invention provides a process for the synthesis of a Ziegler Natta procatalyst for use in the manufacture of polyolefin which comprises heating a reaction mixture consisting of a titanium compound having at least one titanium halogen bond and a chloro-solvent to a first reactor, said first reactor being provided with filtration elements with defined pore size at the bottom of the reactor, with separate provisions for taking out filtered liquid and reaction slurry and a mechanical stirrer for agitation, to obtain said Ziegler Natta procatalyst, removing excess reactants from said first reactor as a filtrate and feeding said filtrate to at least one further reactor connected to said first reactor in series or in parallel to separate and collect the particles carried over from the first reactor. The filtrate from the at least one further reactor can be subjected to distillation to remove impurities while continuously charging the distillate from the at least one further reactor to the first reactor and establish a continuous cycle, optionally treating the residue from distillation with an alkali to obtain titanium hydroxide, calcining said titanium hydroxide to obtain titanium oxide as a by product.

Preferably, the reaction mixture is heated for a period of from 5 to 90 minutes.

Preferably, said titanium compound having at least one titanium halogen bond and said chloro-solvent are charged continuously in a ratio of 1:0.1 to 1:10 (v/v).

Preferably, said first reactor has a higher pore size filtration element and the at least one further reactor has a lower pore size filtration element.

Preferably, the reaction temperature in said first reactor is at a range of from 65° C. to 135° C.

Preferably, particles of different particle sizes are segregated in situ.

Preferably the fine catalyst particles are separated in first reactor along with filtrate and collected in the at least one further reactor.

Preferably, said titanium compound having at least one titanium-halogen bond comprises $TiCl_4$.

Preferably, said solvent is selected from one or more of chlorobenzene, hexane, decane or toluene.

Preferably, the reactants are charged to reactors at a flow rate in the range of 2 lit/hr·kg to 80 lit/hr·kg solid, and a solid concentration of 0.001 kg/lit to 1.0 kg/lit.

Preferably, said Ziegler Natta procatalyst is spheroidal having a mean particle size in the range of 15 to 80 microns and comprising internal donor(s) partly generated in situ.

Preferably, said internal donor(s) are selected from the group consisting of one or more of methyl benzoate, ethyl benzoate, n-propyl benzoate, i-propyl benzoate, n-butyl benzoate, i-butyl benzoate, dimethyl phthalate, diethyl phthalate, dipropyl phthalate, di-isopropyl phthalate, di-butyl phthalate and di-isobutyl phthalate, succinates and diethers.

Preferably, the first reactor is equipped with a filtration disc of 20 to 50 micron pore diameter and the at least one further reactor is equipped with a filtration disc of 5 to 15 micron pore diameter.

Preferably, the first reactor is equipped with a filtration disc of about 40 micron pore diameter and the at least one further reactor is equipped with a filtration disc of about 10 micron pore diameter.

The present invention also provides a process for manufacture of low fine content polyolefins comprising subjecting olefins to polymerization in the presence of a catalyst system comprising spheroidal Ziegler Natta procatalyst prepared by the process described above and triethyl aluminium cocatalyst optionally along with a selectivity control agent.

The said selectivity control agents are selected from group consisting of esters of monocarboxylic acids and their substituents, alkoxy alkyl benzoates, alkoxy silanes and dialkoxy silanes.

Preferably, said olefin is propylene, and said polymerization is carried out in slurry, gas, or bulk phase.

BRIEF DESCRIPTION OF ACCOMPANYING DRAWINGS

FIG. 1 is a schematic representation of the reactor system of the present invention FIG. 2 is a schematic representation of the reactor system of the invention with two reactors—R1 and R2 with filtration discs of 40 μm and 10 μm respectively and connected in series for in-situ segregation of catalyst of different PSD with optional distillation unit to continuously recover the used solvent for reuse in the reaction. Distillation residue can also be continuously treated to give $TiO_2$ for various applications FIG. 3 is an SEM image to illustrate morphology of the DIBP based catalyst obtained by the semi-continuous process of the invention as in example 1 and 2

DETAILED DESCRIPTION OF THE INVENTION

Figure 1:
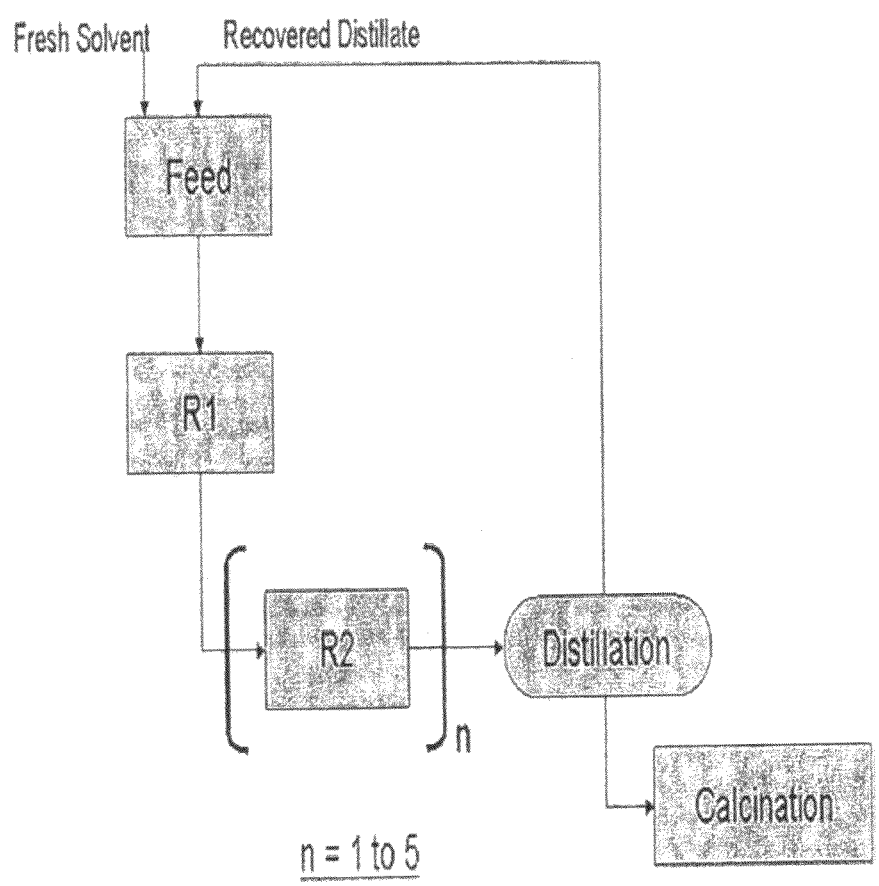

The invention provides a single step semi-continuous process for synthesis of olefin polymerization catalyst which is generally made using multi-step process. The filtered and distilled solvent can also be reused, in a way establishing a true continuous cycle and residue is treated to give $TiO_2$ for various applications.

In one embodiment, the invention provides a semi-continuous process for multi-step olefin catalyst synthesis processes, where reactants are charged in a specially designed reaction system having reactors fitted with filtration elements with defined pore size at the bottom of the reactor, with provision for filtered liquid as well as slurry draining and a mechanical stirrer for agitation. The up-stream reactor always has higher pore diameter filtration element. The down-stream reactor has lower pore diameter filtration element. The reactants are heated to reaction temperature in 5 min to 90 min. On reaching the reaction temperature, a mixture of titanium compound having at least one titanium halogen bond and chloro-solvent is charged continuously in the ratio of 1:0.1 to 1:10 (v/v) from up-stream reactor to flow through all the reactors connected in series. The amount of mix solvent being charged is also simultaneously being taken out from the bottom of the first reactor as filtrate. The filtrate obtained is fed to further reactor connected in series to separate the carry-over of the particles from the first reactor. The filtrate from the further reactor can be distilled to remove the impurities. The resultant distillate is charged continuously to the first reactor. The distillation residue is continuously treated with alkali to give titanium hydroxide, which is then calcined at high temperature to give $TiO_2$ for various applications.

Preferably, the reactor temperature during the reaction is 65° C. to 135° C.

Preferably, the catalyst of desired particle size is segregated in situ for use in different polymerization processes and conditions.

In another embodiment, the invention provides a semi-continuous process for multi-step olefin catalyst synthesis processes, in which flow rate of mix solvent can be in the range of 2 lit/hr·kg to 80 lit/hr·kg solid, and a solid concentration of 0.001 kg/lit to 1.0 kg/lit in both the reactors.

In another embodiment, the invention provides a semi-continuous process for multi-step olefin catalyst synthesis processes, in which washings of the resultant solids obtained after reaction is also done in continuous manner. Wash solvent is charged from the top of the first reactor in continuous manner and filtrate is simultaneously removed from the bottom of the second reactor. The rate of feeding/removal of the wash solvent can be in the range of 10 lit/hr·kg of catalyst to 150 lit/hr·kg of catalyst and the solid concentration of reactor can be kept between 0.001 kg/lit to 1.0 kg/lit in both the reactors.

In another embodiment, the invention provides a semi-continuous process for multi-step olefin catalyst synthesis processes, where reactor consists of removable filtration elements with variable pore diameter as per requirement. The reactors are also fitted with mechanical stirrer for proper mixing. The reactors with varied pore diameter filtration elements can be connected in series to in situ segregate the catalyst particles with different shape and size. Constant volume is maintained in all the reactors connected in series. Solvent is fed from the first reactor to pass through all the reactors in series. As the process combines lower reaction time and particle size based segregation, it is highly energy efficient. Moreover the process can also be used for batch type catalyst synthesis.

Preferably, the mix-solvent consists of $TiCl_4$ and chlorobenzene, $TiCl_4$ and hexane, $TiCl_4$ and decane, or $TiCl_4$ and toluene.

In another embodiment, the invention provides spheroidal Ziegler Natta procatalyst having mean particle size in the range of 15 to 80 microns and comprising internal donor(s) partly generated in situ.

In another embodiment, the invention provides spheroidal Ziegler Natta procatalyst comprising internal donor(s) (if any) selected from the group consisting of methyl benzoate, ethyl benzoate, n-propyl benzoate, i-propyl benzoate, n-butyl benzoate, i-butyl benzoate, dimethyl phthalate, diethyl phthalate, dipropyl phthalate, di-isopropyl phthalate, di-butyl phthalate and di-isobutyl phthalate, succinates, and diethers.

In a further embodiment, the invention provides a method for polymerization of olefin to produce narrow PSD and low fine containing polymer, the method comprising contacting the olefin with a catalyst system comprising spheroidal Ziegler Natta procatalyst, triethyl aluminium cocatalyst optionally along with a selectivity control agent.

In a still further embodiment of the invention, there is provided spheroidal low fine content polyolefin particles synthesized by the method comprising contacting the olefin with a catalyst system comprising spheroidal Ziegler Natta procatalyst, triethyl aluminium cocatalyst optionally along with a selectivity control agent such as esters of monocarboxylic acids and their substituents, alkoxy alkyl benzoates, alkoxy silanes and dialkoxy silanes.

The invention provides an economical method for synthesis of spheroidal catalyst particles by recovering and reusing the solvents used for the synthesis and washings. As four processes, namely reaction, filtration, solvent recovery and residue treatment is combined in one single process; minimum solvent usage and minimum volume of reactor system can be ensured. The solvents are recovered through distillation of the filtrate obtained from the bottom of the downstream reactor. The distilled solvent obtained is at slightly higher temperature and is charged as it is in the reactor eliminating the preheating step as mentioned in relevant prior art U.S. Pat. No. 6,770,718. In this manner a true continuous cycle is established for efficient energy and material Usage.

The Ziegler Natta procatalyst and the polyolefin resin in the following examples have been characterized by various methods. Mean particle size and span is obtained by particle size analyzer using laser and optical diffraction method on CILAS 1180 particle size analyzer. Span is calculated by ratio of $(D_{90}-D_{10})/D_{50}$ where if $D_n=X$ microns then it signifies that n% of the total particle population is below X microns. Bulk density is measured by measuring the tapped volume and weight of certain quantity of powder and by dividing weight of the powder by the tapped volume. Morphology was explored with FEI Inspect Scanning Electron Microscope. Donor content is determined using high pressure liquid chromatography of the catalyst solution in methanol. Polymer bulk density is calculated by measuring tapped volume and weight of fixed polymer resin quantity and then dividing weight by volume. average particle size and fines (<120 microns) content of the polymer is analyzed using sieve shaker.

The reactor system that is used to synthesize the catalyst of the invention is depicted in its basic embodiment in FIG. 1. The system essentially comprises of a feed section provided with an inlet, and an outlet, that is connected to a first reactor R1. This in turn is connected in series to at least one further reactor R2 downstream. Reactor R2 in turn is connected to a distillation unit (4). Each of the reactors R1 and (R2)n is provided at the bottom portion thereof with a filtration element. The distillation section is connected to the feed section through an outlet such that the distillate can be recharged back to the reactors along with fresh reactant while maintaining a desired concentration in the reactant feed. The first reactor as mentioned above is provided with a filtration element at the bottom thereof in order to remove excess reactants as a filtrate through filtration. Similarly, this filtrate obtained from the first reactor is fed to at least one further reactor in order to retain the carried over fine particles. The excess reactants from the subsequent reactor are also removed therefrom as a filtrate through a filtration element provided at the bottom thereof. The filtrate is then, if desired, fed to a next subsequent reactor.

Figure 2:
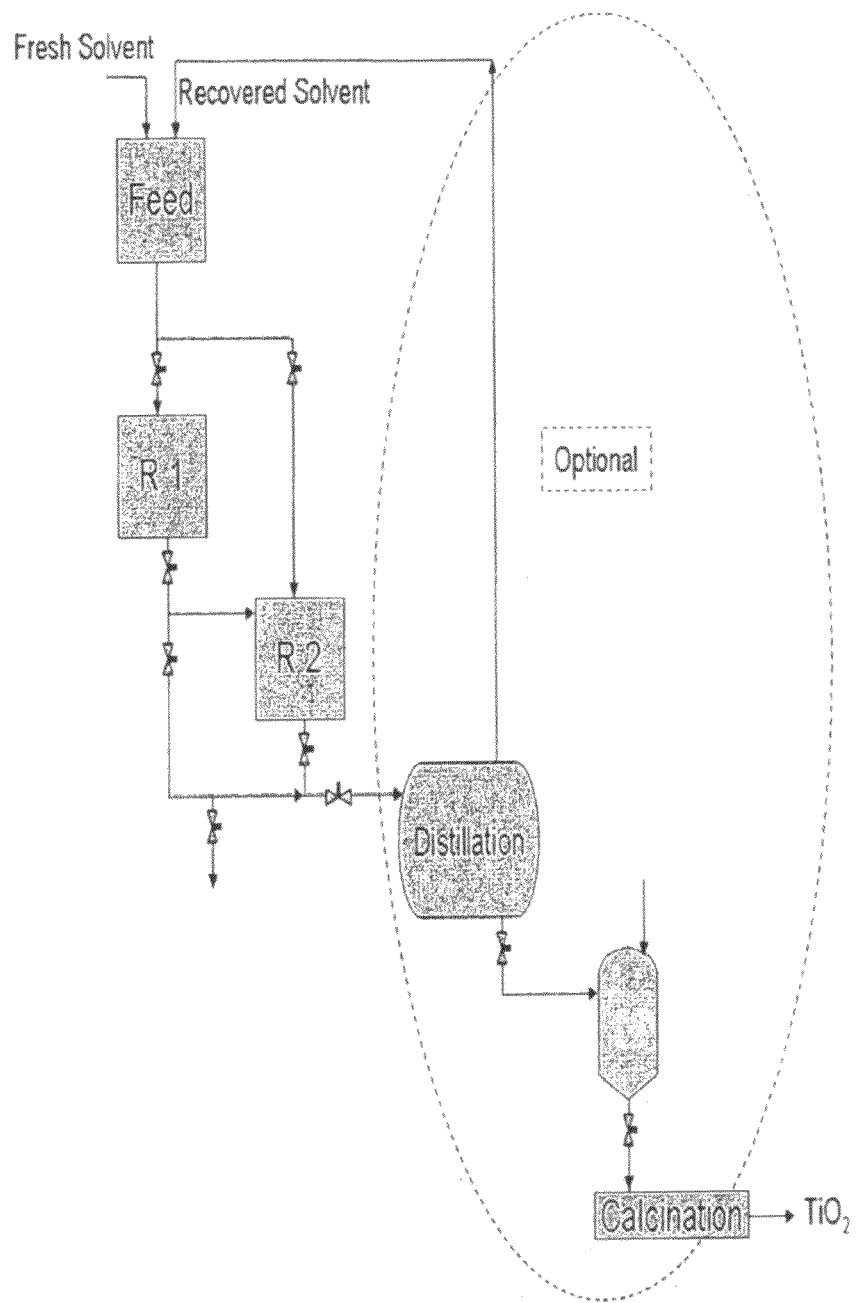

The arrangement of the secondary reactors can be either in series or in parallel. Thus, each subsequent reactor may be connected to the preceding further reactor and to a subsequent further reactor such that the filtrate from each preceding further reactor is fed therein and the filtrate therefrom is fed to the next further reactor downstream. This is depicted in FIG. 2. However, if desired, each further reactor may be independently connected to the first reactor R1 on one end and to the distillation column at another end. The advantage of either in series connection or in parallel connection for the further reactors is that if the reactors are in parallel, the reaction and filtration can be carried out simultaneously in all reactors. If the reactors are in series, through bypass means that are provided, the filtrate can be fed from the first reactor to any of the further reactors, thereby ensuring that the reaction can start in any reactor. The series connection ensures segregation of catalyst in situ dependent on the different PSD's. A parallel connection ensures that the reaction can be accelerated to a faster rate if desired. The flexibility that is provided through the choice of series or parallel connections of the further reactors provides a wider application and utility.

The filtration elements of the further reactors are of smaller mesh size as compared to the first reactor. The distillation unit is connected to a calcination unit wherein the distillation residue can be calcined to obtain $TiO_2$ for various applications.

The invention is further illustrated by way of the following illustrative and non-limiting examples. Variations and modifications are possible of the details given in the examples without departing from the scope and spirit of the invention.

Example 1

Synthesis of DIBP Based Catalyst Using Semi Continuous Process

Two reactors R1 and R2 of 1.5 liter capacity each with different pore size filtration disc fitted at the bottom of the reactor are connected in series. The first reactor is having 40 micron pore diameter filtration disc, while the second is having 10 micron pore diameter filtration disc. Both the reactors are charged with equal volume mixture of 115 ml $TiCl_4$ and chlorobenzene. Under stirring at 300 rpm, 10 gm of spherical magnesium Alkoxide is charged in first reactor. The reactor temperature is kept at 30° C. 4.5 ml Donor Diisobutyl Phthalate (DIBP) is charged immediately after precursor charging in first reactor and temperature of both the reactors is raised to 110° C. in 25 min. On reaching the titanation temperature, equal volume mixture of 230 ml $TiCl_4$ and chlorobenzene is charged in the first reactor at the rate of 20-25 lit/hr·kg solid, simultaneously withdrawing filtrate along with particles less than 40 micron size from reactor bottom at the same rate. The filtrate of the first reactor is charged in the second reactor, where all the particles are retained resulting in situ segregation of the catalyst particles. The filtrate from the second reactor bottom can be continuously distilled in a separate distillation column to use distillate for feeding to first reactor 0.8 ml Benzoyl chloride is charged in both the reactors 15 min before terminating the reaction. On completion of addition, $TiCl_4$ and chlorobenzene is filtered off. Wash solvent is charged at the rate of 70-80 lit/kg solid and removed at the same rate maintaining close to 0.05 kg/lit concentration in the reactor. The final solid obtained is dried under nitrogen at 50° C.

Example 2

Synthesis of DIBP Based Catalyst Using Semi Continuous Process

The process of example 1 is repeated with 15 g of magnesium alkoxide instead of 10 g to see the effect of variation of magnesium to titanium ratio and magnesium to ester ratio on composition and morphology of the catalyst. This synthesis is done also to show use of the reaction set up of example 1 for producing more catalyst quantity.

Example 3

Comparative Example for Synthesis of DIBP Based Catalyst Using Batch Process

The magnesium alkoxide (10 gm) is treated with an equal volume mixture of 230 ml $TiCl_4$ and chlorobenzene in three step treatment at 110° C. Internal donor DIBP is added in first step. Benzoyl Chloride is added in the last step. After three-stage treatment, solid procatalyst separated from liquid reactants and given four washes with 200 ml Hexane each and then it is dried at 50° C. under stream of nitrogen.

Example 4

Synthesis of EB Based Catalyst Using Semi Continuous Process

The process of example 1 is repeated only DIBP is replaced with Ethyl benzoate (EB) and reaction temperature is kept 100° C. in place of 110.

Example 5

Synthesis of EB Based Catalyst Using Batch Process

The process of example 3 is repeated only DIBP is replaced with Ethyl benzoate (EB) and reaction temperature is kept 100° C. in place of 110

Example 6 and 7

Polymerization of Propylene Using Procatalyst of Example 1 and Example 3

Solid procatalysts (0.08 g) of example 1 and example 3 was mixed with triethyl aluminium cocatalyst (1.2 g) and selectivity control agent (0.05 g). The catalysts were mixed in such proportions that the aluminium:titanium ratio is maintained at 250:1. The mole ratio of selectivity control agent to titanium was kept at 8:1. The catalyst was employed to polymerize propylene in slurry phase with hexane as the diluent under a constant propylene pressure of 5 kg for 2 hr at 70° C., followed by addition of 50 mmol of hydrogen to terminate the polymerization.

Example 8 and 9

Polymerization of Propylene Using Procatalyst of Example 4 and Example 5

Solid procatalysts (0.08 g) of example 4 and example 5 was mixed with triethyl aluminium cocatalyst (1.2 g) and selectivity control agent (0.05 g). The catalysts were mixed in such proportions that the aluminium:titanium ratio Was maintained as 250:1. The mole ratio of selectivity control agent to titanium was kept at 50:1. The catalyst was employed to polymerize propylene in slurry phase with hexane as the diluent under a constant propylene pressure of 5 kg for 2 hr at 70° C., followed by addition of 50 mmol of hydrogen to terminate the polymerization.

TABLE 1

Comparative analysis of DIBP based catalyst synthesized in example 1, example 2 and example 3

| Procatalyst of | Yield (gm) | Batch time (hrs) | Ti (wt %) | Mg (wt %) | Ethoxy (wt %) | Donor (wt %) | Particle Size Distribution | | |
|---|---|---|---|---|---|---|---|---|---|
| | | | | | | | D10 | Mean | Span |
| Example 1 | 9.4 | 3 | 3.2 | 16.9 | 0.50 | 12.7 | 22 | 40 | 0.88 |
| Example 2 | 13.9 | 3 | 2.7 | 18.8 | 0.45 | 11.1 | 19 | 36 | 0.92 |
| Example 3 | 10.1 | 10 | 2.8 | 17.3 | 0.53 | 12.2 | 3 | 29 | 1.52 |

TABLE 2

Comparative analysis of EB based catalyst synthesized in example 4 and example 5

| Procatalyst of | Yield (gm) | Batch Time (Hrs) | Ti (wt %) | Mg (wt %) | Ethoxy (wt %) | Donor (wt %) | Particle Size Distribution | | |
|---|---|---|---|---|---|---|---|---|---|
| | | | | | | | D10 | Mean | Span |
| Example 4 | 9.6 | 2.5 | 3.0 | 17.6 | 0.48 | 15.7 | 26 | 42 | 0.78 |
| Example 5 | 10.4 | 10.0 | 2.5 | 18.3 | 0.54 | 14.9 | 3 | 27 | 1.37 |

TABLE 3

Comparative analysis of polymer resins synthesized by using the procatalyst of example 1 and example 3

| Example | Activity (kg PP/g cat) | XS (wt %) | Avg. Particle Size (Inch) | Fines (wt %) |
|---|---|---|---|---|
| Example 6 | 9.8 | 2.1 | 0.022 | 2.2 |
| Example 7 | 9.5 | 2.3 | 0.016 | 9.7 |

TABLE 4

Comparative analysis of polymer resins synthesized by using the procatalyst of example 4 and example 5

| Example | Activity (kg PP/g cat) | XS (wt %) | Avg. Particle Size (Inch) | Fines (wt %) |
|---|---|---|---|---|
| Example 8 | 4.5 | 2.6 | 0.018 | 3.4 |
| Example 9 | 4.4 | 2.8 | 0.015 | 10.2 |

Figure 3:
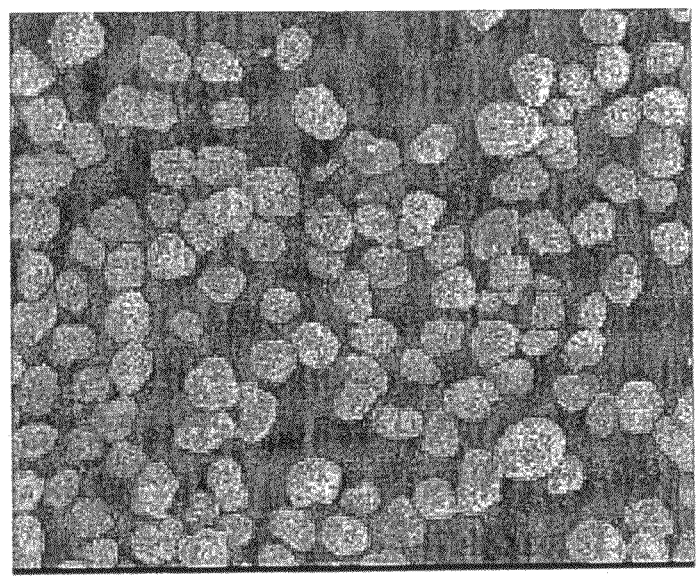
Figure 4:
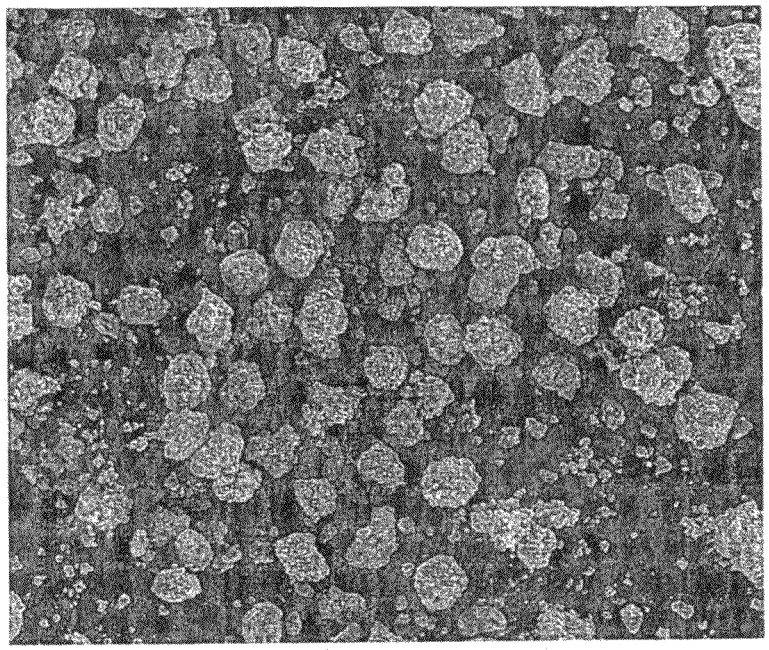
FIG. 4 is an SEM image to illustrate morphology of the DIBP based catalyst obtained by the batch process as in example 3.

Table 1 compares the batch time, yield and characteristics of DIBP based catalyst prepared (as in example 1, 2 and 3 respectively) by using semi-continuous process with varied solvent ratio and catalyst prepared using batch type synthesis process. Consistent composition is obtained even on varying the solvent ratio and batch size in semi continuous process. Particle shape is retained as shown in FIG. 3 with narrow particle size distribution. The shape of the catalyst particle as in FIG. 3 can be better retained by carrying out reaction and filtration simultaneously. Catalyst made using batch process has comparatively broad particle size distribution, lower particle size and inferior morphology as indicated in FIG. 4.

Figure 5:
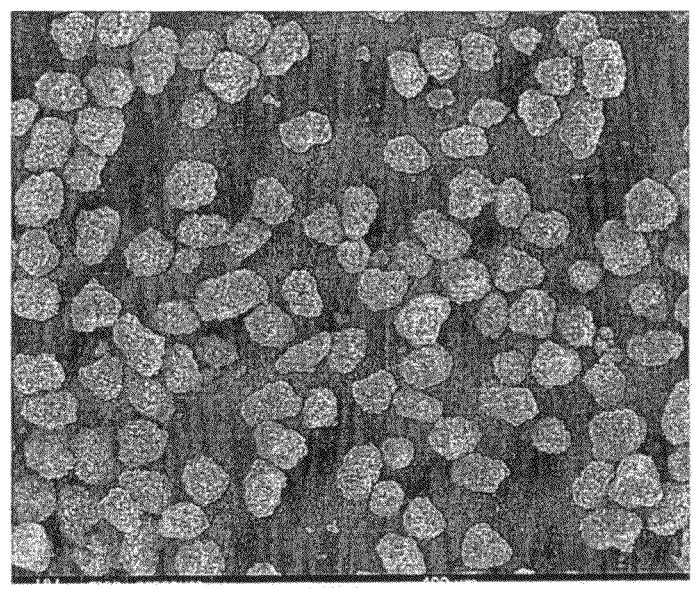
FIG. 5 is an SEM image to illustrate morphology of the EB based catalyst obtained by the semi-continuous process of the present invention as in example 4.
Figure 6:
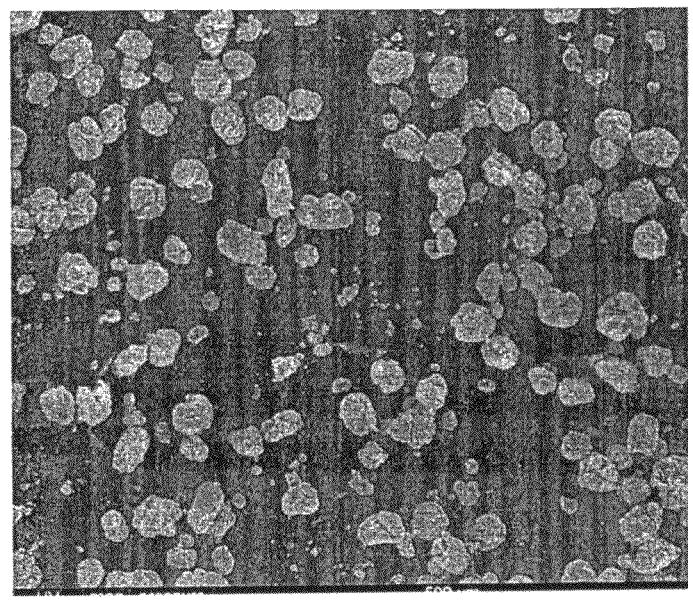
FIG. 6 is an SEM image to illustrate morphology of the EB based catalyst-obtained by the batch process as in example 5.

Table 2 compares the batch time, yield and characteristics of EB based catalyst prepared (as in example 4 and 5 respectively) by using semi-continuous process and using batch type synthesis process. Particle shape is retained well as shown in FIG. 5 with narrow particle size distribution. Catalyst made using batch process has broad particle size distribution, lower particle size and inferior morphology as indicated in FIG. 6.

Table 3 compares slurry polymerization performance of DIBP based catalyst prepared (as in example 1 and 3 respectively) by using semi-continuous process and batch process respectively. Polymer resin from semi continuous process based catalyst has higher particle size and lower fine content as compared to the resin from batch process based catalyst.

Table 4 compares slurry polymerization performance of EB based catalyst prepared (as in example 4 and 5 respectively) by using semi-continuous process and batch process respectively. Polymer resin from semi continuous process based catalyst has higher particle size and lower fine content as compared to the resin from batch process based catalyst.

ADVANTAGES OF INVENTION

1. Reaction and filtration can be carried out in all the reactors simultaneously.
2. Feed can go in parallel to all reactors or in series or both. R1, R2, R3, Rn are reactors connected in series or parallel. Parallel feed can accelerate reaction to a faster rate.
3. Reaction can be started in any of the reactors.
4. Reaction can also take place in batch mode in any reactor if required.
5. Provision for by passing any of the reactors.
6. Provision for directly feeding recovered solvent to any of the reactor, bypassing feed vessel.
7. Highly energy efficient process.

We claim:

1. A semi-continuous process for the synthesis of a narrow particle size distribution Zeigler Natta procatalyst for use in the manufacture of polyolefins comprising of following steps:
   (a) mixing a reaction mixture essentially consisting of titanium compound having at least one titanium halogen bond and a chlorinated solvent in feed section;

(b) charging a first reactor with said reaction mixture;

(c) continuously removing excess reactants from said first reactor as a filtrate through a filtrate section placed at the bottom of said first reactor;

(d) feeding said filtrate to at least one further reactor connected to said first reactor to retain the carried over fine particles from said first reactor; continuously removing excess reactants from said at least further reactor as a filtrate through a filtrate section placed at the bottom of said at least one further reactor and, optionally, feeding said filtrate to next said at least one further reactor;

(e) repeating step (d) for n number of times in series, wherein reactors are arranged in series or parallel;

(f) subjecting the said filtrate from the last of said at least one further reactor to a distillation section to remove impurities and recover the distillate; and continuously charging the distillate from the distillation section to the feed section; wherein a desired equilibrium between fresh and recovered distillate and a desired resultant concentration of reactant feed are maintained; and (g) optionally treating the residue from distillation section with an alkali to obtain titanium hydroxide and calcining said titanium hydroxide to obtain titanium oxide as a by product.

2. The process as claimed in claim 1, wherein said reaction mixture is heated to reaction temperature prior to charging in said first reactor.

3. The process as claimed in claim 1, wherein all reactors are provided with respective filtration elements with defined pore size at the bottom thereof, with separate provisions for filtered liquid as well as slurry draining and a mechanical stirrer for agitation.

4. The process as claimed in claim 1, wherein said first reactor is equipped with a highest pore size filtration element and said last said at least one further reactor is equipped with a lowest pore size filtration element.

5. The process as claimed in claim 1, wherein all reactors are arranged in series.

6. The process as claimed in claim 1, wherein n is in the range of 1 to 5.

7. The process as claimed in claim 1, wherein said distillation section is connected to any previous reactor in parallel and the recovered distillate is charged from the distillation section to any reactor continuously or intermittently, as desired.

8. The process as claimed in claim 1, wherein said first reactor is connected to any of the at least one further reactors in parallel to allow filtrate from the first reactor to flow into any said further reactors independently as desired.

9. The process as claimed in claim 1, wherein said feed section is connected to any of the further reactors in parallel to allow charging of the fresh solvent or the recovered distillate or any combination thereof directly from said feed to any of the said further reactor.

10. The process as claimed in claim 1, wherein said reaction mixture is heated for a time period of from 5 to 90 minutes.

11. The process as claimed in claim 1, wherein said titanium compound has at least one titanium halogen bond and said chlorinated solvent are charged continuously in a ratio of 1:0.1 to 1:10 (v/v).

12. The process as claimed in claim 1, wherein the reaction temperature in said first reactor is at a range of from 65° C. to 135° C.

13. The process as claimed in claim 1, wherein particles of different sizes are segregated in situ.

14. The process as claimed in claim 1, wherein said titanium compound having at least one titanium halogen bond comprises $TiCl_4$.

15. The process as claimed in claim 1, wherein said chlorinated solvent is chlorobenzene.

16. The process as claimed in claim 1, wherein the reaction mixture is charged to said reactors at a flow rate in the range of 2 lit/hr·kg to 80 lit/hr·kg solid, and a solid concentration of 0.001 kg/lit to 1.0 kg/lit.

17. The process as claimed in claim 1, wherein said Ziegler Natta procatalyst is spheroidal having a mean particle size in the range of 15 to 80 microns and comprising internal donor (s) partly generated in situ.

18. The process as claimed in claim 17, wherein said internal donor(s) are selected from the group consisting of one or more of methyl benzoate, ethyl benzoate, n-propyl benzoate, i-propyl benzoate, n-butyl benzoate, i-butyl benzoate, dimethyl phthalate, diethyl phthalate, dipropyl phthalate, di-isopropyl phthalate, di-butyl phthalate and di-isobutyl phthalate, succinates and diethers.

19. The process as claimed in claim 1, wherein n is 1.

20. The process as claimed in claim 1, wherein the first reactor is equipped with a filtration disc of 20 to 50 micron pore diameter and the further reactor is equipped with a filtration disc of 5 to 15 micron pore diameter.

21. The process as claimed in claim 20, wherein the first reactor is equipped with a filtration disc of 40 micron pore diameter and the further reactor is equipped with a filtration disc of 10 micron pore diameter.

22. A system for the semi-continuous synthesis of a narrow particle size distribution Zeigler Natta procatalyst for use in the manufacture of polyolefins, said system consisting essentially of:

(a) a feed section provided with an inlet for input of reactants and fresh solvent and optionally a second inlet for input of recovered distillate;

(b) a first reactor connected downstream of said feed section to receive a reaction mixture formed in said feed section, said first reactor being provided with a filtration element at the bottom thereof to remove excess reactants therefrom as a filtrate;

(c) at least one further reactor provided downstream of said first reactor and connected thereto to receive the filtrate from said first reactor and to retain carried over fine particles from said first reactor, said second reactor being provided with a filtration element at the bottom thereof to remove excess reactants therefrom as a filtrate for feeding into a distillation unit or, optionally, to a subsequent further reactor;

(d) a distillation unit provided downstream of said at least one further reactor to remove impurities and recover a distillate, for charging the feed section to maintain a desired equilibrium between fresh and recovered solvent and a desired resultant concentration of reactant feed;

(e) optionally a calcination section to calcine residue from the distillation section and obtain titanium hydroxide as a byproduct.

23. The system as claimed in claim 22, wherein said at least further reactors are connected in series with said first reactor with each of said further reactors being provided with respective filtration elements of pore size that reduce further away from said first reactor.

24. The system as claimed in claim 22, wherein said at least further reactors are connected in parallel to said first reactor.

25. The system as claimed in claim 22, wherein one or more bypass lines are provided from said first reactor to each respective further reactors in order to bypass the preceding further reactor(s) as desired.

26. The system as claimed in claim 22, wherein each of said further reactors are independently connected to said distillation unit in order to bypass any of the subsequent further reactors as desired during discharge of filtrate to said distillation unit.

27. The system as claimed in claim 22, wherein up to five further reactors are present.

* * * * *